United States Patent [19]

Ochiai et al.

[11] Patent Number: 4,688,266
[45] Date of Patent: Aug. 18, 1987

[54] CAR DATA TRANSMISSION DEVICE FOR OPTICAL FIBERS

[75] Inventors: Hajime Ochiai, Nishinomiya; Kenji Morihara, Takarazuka, both of Japan

[73] Assignee: Mitsubishi Denki Kabushiki Kaisha, Tokyo, Japan

[21] Appl. No.: 931,030

[22] Filed: Nov. 17, 1986

Related U.S. Application Data

[63] Continuation of Ser. No. 584,623, Feb. 29, 1984, abandoned.

[30] Foreign Application Priority Data

Mar. 2, 1983 [JP] Japan .............................. 58-31389[U]

[51] Int. Cl.⁴ .............................................. H04B 9/00
[52] U.S. Cl. .................................. 455/612; 350/96.10; 350/96.16; 350/96.20
[58] Field of Search ................ 350/96.10, 96.16, 96.20, 350/96.23, 96.24; 455/612; 370/13, 16, 88

[56] References Cited

U.S. PATENT DOCUMENTS

| | | | |
|---|---|---|---|
| 4,090,067 | 5/1978 | Bell, III et al. | 455/612 X |
| 4,190,821 | 2/1980 | Woodward | 370/88 X |
| 4,276,643 | 6/1981 | Laprie et al. | 376/16 X |
| 4,317,614 | 3/1982 | Palmer | 350/96.16 |
| 4,446,551 | 5/1984 | Seo | 370/16 |
| 4,506,357 | 3/1985 | Nakayashiki et al. | 370/16 |

FOREIGN PATENT DOCUMENTS

| | | | |
|---|---|---|---|
| 0093337 | 7/1980 | Japan | 455/612 |
| 31632 | 2/1983 | Japan | |

OTHER PUBLICATIONS

"Fiber Optic Communications Loop" by Balliet, IBM Technical Disclosure Bulletin, vol. 27, No. 1B, Jun. 1984.

*Primary Examiner*—William L. Sikes
*Assistant Examiner*—Akm E. Ullah
*Attorney, Agent, or Firm*—Oblon, Fisher, Spivak, McClelland & Maier

[57] ABSTRACT

In a car data transmission device installed in cars to transmits data through the cars by means of optical fibers, optical fiber lines for data transmission are provided to be looped in duplex through a row of cars; each of cars is provided with optical fiber cables, each receiving therein the duply looped optical fiber lines as one unit whose data transmitting direction different each other; and jointing optical fiber cables are placed between the adjacent cars to pass the duply looped optical fiber lines as one unit received in the optical fiber cable placed in each of the adjacent cars whereby interruption of the data transmission lines is prevented even though a trouble of transmission such as breaking of one of the jointing optical cables occurs.

2 Claims, 6 Drawing Figures

CAR DATA TRANSMISSION DEVICE FOR OPTICAL FIBERS

This application is a continuation of application Ser. No. 584,623, filed Feb. 29, 1984, now abandoned.

BACKGROUND OF THE INVENTION

1. Field of the Invention

The present invention relates to a car data transmission device equipped with optical fiber cables.

2. Discussion of Background

As a car data transmission device using optical fibers, a construction as shown in FIG. 1 is considered in which transmission lines are looped in two rows through a series of cars.

In FIG. 1, a transmission controlling device 2 which transmits and receives optical signals is installed in each car 1. The optical signals transmitted from the transmission controlling device 2 is passed through a optical fiber line 3 to be received in a subsequently connected transmission controlling device 2. In the FIG. 1, arrow marks indicate the direction of transmitting optical signals. Generally, only one looped line is used to send data in the duplex transmission lines and the other is for a spare system.

In case of the transmission line system shown in FIG. 1, if one of the two lines is broken, reconstruction of the transmission system is made by utilizing the other line to continue data transmission.

FIGS. 2 and 3 show examples in which a separate transmission path is constituted by reconstructing the duplex line system when the main transmission line is broken.

FIG. 2 shows that the inner looped line is broken at a point 4 and the duplex line system is reconstructed to use the outer looped line. FIG. 3 shows that both lines are broken at points 7,7 and the system is reconstructed to use a looped transmission line as shown by the dotted line in the transmission controlling devices 2.

In the duplex transmission line system, there may be constructed in such a manner that a single optical fiber cable is used for the connecting part between cars and all optical fiber lines passed between the cars are received in the optical fiber cable. FIG. 4 shows an example of such construction in which the reference numeral 8 designates optical fiber cables for gathering the optical fiber lines into one unit and 9 designates jointing optical fiber cables used as joints between the cars. In the construction shown in FIG. 4, if a jointing cable between the cars is cut to be separated, the duplex transmission lines are entirely broken and it is no longer possible to reconstruct the transmission lines.

SUMMARY OF THE INVENTION

It is an object of the present invention to provide a car data transmission device for optical fiber lines capable of reconstruction of transmission line even though any one of jointing cables for jointing between cars is broken.

The foregoing and the other objects of the present invention have been attained by providing a car data tranmission device installed in cars to transmits data through the cars by means of optical fibers characterized in that optical fiber lines for data transmission are provided to be looped in duplex through a row of cars; each of the cars is provided with optical fiber cables, each receiving therein the duply looped optical fiber lines as one unit whose data transmitting directions are different each other; and jointing optical fiber cables are placed between the adjacent cars to pass the duply looped optical fiber lines as one unit received in the optical fiber cable placed in each of the adjacent cars whereby interruption of the data transmission lines is prevented even though a trouble of transmission such as breaking of one of the jointing optical cables occurs.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference numerals designate like or corresponding parts throughout the several views and wherein.

DESCRIPTION OF THE PREFERRED EMBODIMENTS

An embodiment of the present invention will be described with reference to FIGS. 5 and 6.

Figure 1:
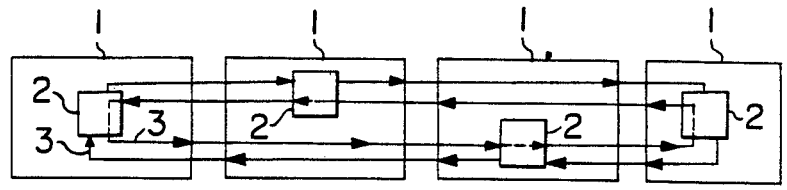
FIG. 1 is a structural diagram of a car data transmission device in which data transmission lines are looped through a row of cars in duplex.
Figure 2:
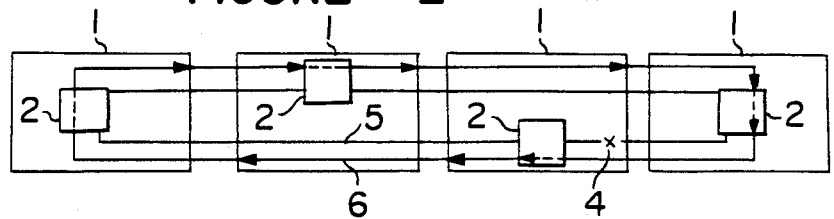
FIG. 2 is a similar view showing an example in which data transmission lines are reconstructed when a part of the data transmission lines is broken.
Figure 3:
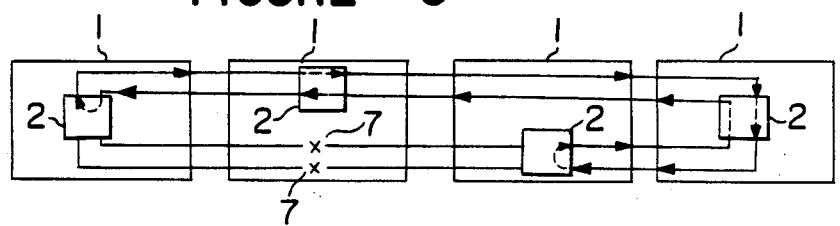
FIG. 3 is a similar view showing another example in which a trouble different from that in FIG. 2 takes place.
Figure 4:
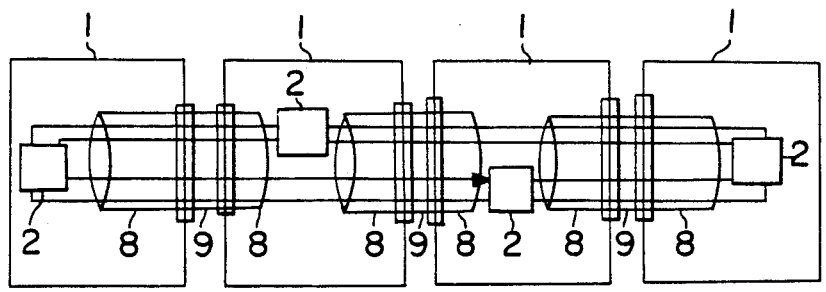
FIG. 4 is a structural diagram of a conventional device in which optical fiber lines looped through a row of cars are gathered in each of optical fiber cables in each of the cars.
Figure 5:
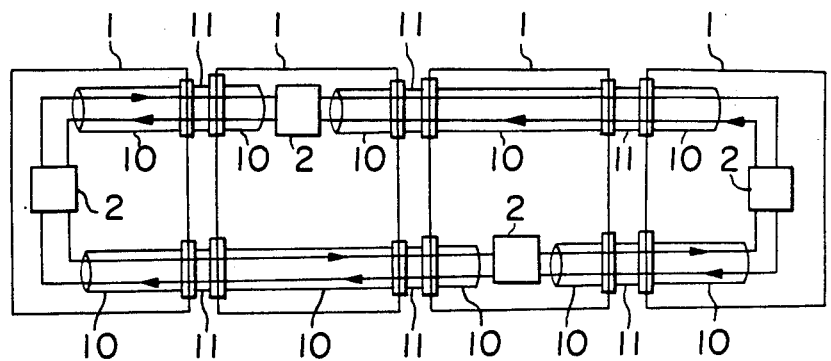
FIG. 5 is a structural diagram of an embodiment of the data transmission device of the present invention in which optical fiber lines whose transmissin directions are different each other are gathered into one unit in each of optical fiber cables.

In FIG. 5, the reference numeral 10 designates optical fiber cables passing the optical fiber lines therethrough and the numeral 11 designates jointing optical fiber cables for jointing between the cars.

As shown in FIG. 5, there are formed two loops of optical fiber lines through a row of cars and the optical fiber lines have data transmitting direction different each other. The optical fiber lines whose data transmitting directions are different each other are passed as one unit into each of the optical fiber cables 10 placed in the cars 1 whereby each of the optical fiber cables holds therein a looped optical fiber line for sending data and a looped optical fiber line for returning data.

With the construction, even though one of the optical fiber lines is broken, transmission of the data can be restarted by selecting the other route.

Figure 6:
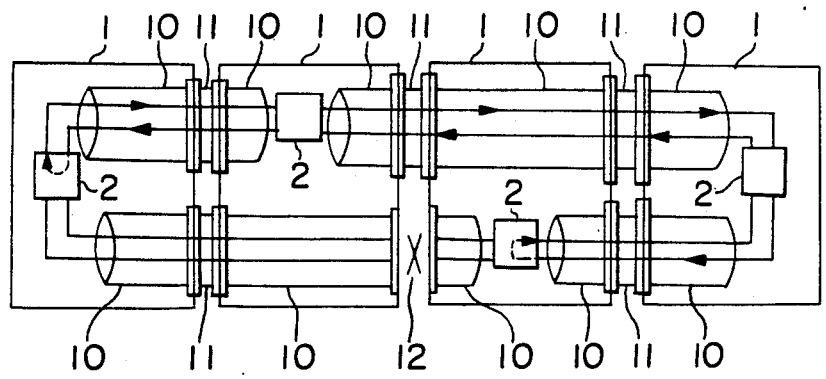
FIG. 6 is a diagram, similar to FIG. 5, showing an example in which a trouble takes place in the data transmission lines.

FIG. 6 shows that reconstruction of the data transmission system is made in case of breaking of a jointing optical fiber cable at the position indicated by the reference numeral 12. The data transmission system is reconstructed in such a manner that a data transmission loop is formed between a transmission controlling device 2 placed in the first car (drawn at the left end in FIG. 6) and a transmission controlling device 2 placed in the third car through the remaining jointing optical cables 11.

Numerous modifications and variations of the present invention are possible in light of the above teachings. It is therefore to be understood that within the scope of the appended claims, the invention may be practiced otherwise than as specifically described herein.

We claim:

1. A fiber optic data transmission system comprising:
   a plurality of stations which are to communicate with each other;
   a first duplex data communication path having a first portion transmitting in a first direction and a second portion transmitting in a second direction wherein said duplex data communication path is connected between each of said plurality of stations and in order to provide a series connection of said stations;
   a second duplex data communications path having a first portion for transmitting in said first direction and a second portion for transmitting in said second direction in said second duplex data communicating system is connected between each of said stations being parallel with said first data communications path;
   a plurality of a first optical fiber lines wherein one of said first optical fiber lines is located within each station and wherein each of said first optical fiber line contains a part of said first portion of said first data communication path and a part of said second poriton of said second data communication path;
   a plurality of second optical fiber lines wherein each station has one of said second fiber optical lines and wherein each of said second fiber optic lines contains a part of said second portion of said first data communication path and a part of said first portion of said second data communication path;
   first plurality of jointing optical fiber means for connecting together adjacent ones of said plurality of first optical fiber lines wherein said first plurality of jointing optical fiber cable means are each positioned between adjoining stations;
   a second plurality of jointing optical fiber means for connecting together adjacent ones of said second plurality of optical fiber lines wherein said second plurality of jointing optical fiber means are each positioned between adjoining stations;
   a plurality of control means each connected in each one of said stations wherein each one of said plurality of control means provides a first path of communication when there is an uninterrupted path in both said first and said second optical fiber lines and wherein at least two of said plurality of control mean are adjusted so as to provide a second communication path when one of said first and second optical fiber lines has had its communication paths interrupted.

2. The system according to claim 1 wherein the interruption in said data communications path is the breakage of one of said jointing optical fiber cables.

* * * * *